Sept. 30, 1969 A. H. BOBECK 3,470,546

MAGNETIC MEMORY ARRANGEMENT COMPRISING DOMAIN WALL PROPAGATION CHANNELS

Filed Sept. 16, 1966 4 Sheets-Sheet 1

INVENTOR
A. H. BOBECK
BY Herbert M. Shapiro
ATTORNEY

Sept. 30, 1969 A. H. BOBECK 3,470,546

MAGNETIC MEMORY ARRANGEMENT COMPRISING DOMAIN WALL PROPAGATION CHANNELS

Filed Sept. 16, 1966 4 Sheets-Sheet 4

United States Patent Office 3,470,546
Patented Sept. 30, 1969

3,470,546
MAGNETIC MEMORY ARRANGEMENT COMPRISING DOMAIN WALL PROPAGATION CHANNELS

Andrew H. Bobeck, Chatham, N.J., assignor to Bell Telephone Laboratories, Incorporated, Murray Hill and Berkeley Heights, N.J., a corporation of New York Filed Sept. 16, 1966, Ser. No. 579,904
Int. Cl. G11c *11/02, 5/06*
U.S. Cl. 340—174 7 Claims

ABSTRACT OF THE DISCLOSURE

Single wall domain propagation channels are herein adapted to provide a memory array. A matrix of two position bit locations is operated on a random-access basis to move domains selectively between the two positions at each location.

This invention relates to information storage circuits and, more particularly, to such circuits wherein information is stored in a magnetic medium.

It is well known in the art to store information at bit locations defined in a magnetic medium such as an anisotropic film of magnetic material. In the operation of this type of storage arrangement, hard direction word fields are applied for writing and for reading information. Those fields in cooperation with concurrent digit fields affect nonselected bit locations in the memory to change the information stored there is an uncontrolled manner. Such uncontrolled changes are commonly known as "creep effects" and are reduced by aperturing the film, segmenting the film into film spots, reducing the hard direction field, or spacing bit locations relatively far apart.

In each instance the course undertaken to avoid creep effects is costly or either reduces operating margins or bit capacity, or both. For example, operating margins for such films are reduced because the hard direction word field necessarily exceeds the film anisotropy field in order to effect write or read operations. Yet the word field is advantageously low to avoid creep effects. Obviously compromise is required. In addition, although digit fields need only exceed a low value necessary to overcome dispersion for tipping flux to a selected direction along the easy axes, those fields are still sufficiently high to cause creep effects. Moreover, digit currents in such arrangements are necessarily below a value which causes irreversible switching by domain wall motion along the easy axis in nonselected locations in the memory. It is, thus, desirable to keep digit fields as low as possible.

Copending applications Ser. No. 579,995, filed Sept. 16, 1966, for P. C. Michaelis, and Ser. No. 579,931, filed Sept. 16, 1966, for A. H. Bobeck, U. F. Gianola, R. C. Sherwood, and W. Shockley disclose shift register implementations suitable for the controlled movement of information, stored as the presence and absence of single wall domains, along transverse axes in a magnetic sheet. This invention, in one of its aspects, is based on the realization that a single wall domain may be stored in a first position of each of a matrix of multiposition bit locations defined in a sheet of magnetic material and that the domains in selected locations may be moved controllably during a write operation to unique second positions within corresponding bit locations, with a range of drive fields which enable relatively large margins yet avoid uncontrolled creep effects.

An object of this invention, then, is a new and novel magnetic memory arrangement.

The foregoing and further objects of this invention are realized in one embodiment thereof wherein a matrix of multiposition bit locations are defined in a sheet of magnetic material. Each bit location includes first and second information positions and two intermediate positions. Each first position includes a single wall domain representing a binary zero. The single wall domain is selectively moved to the second position, through the intermediate positions, for representing a binary one there. Domains in partially selected positions are moved temporarily to intermediate positions during a select operation. A random access memory is provided.

In a second embodiment, each bit location includes first and second information positions and a single intermediate position. A linear select memory is provided.

Accordingly, a feature of this invention is a magnetic memory including a sheet of magnetic material, means defining a plurality of multiposition bit locations in that sheet, and means selectively moving a single wall domain to first and second positions in those bit locations for representing binary zeros and binary ones respectively.

The foregoing and further objects and features of this invention will be more fully understood from a consideration of the following detailed discussion rendered in conjunction with the accompanying drawing, in which:

FIG. 1 shows a random access memory arrangement in accordance with one aspect of this invention. The memory arrangement comprises a sheet 11 of magnetic material, illustratively yttrium orthoferrite, substantially isotropic in the plane of the sheet and having a preferred magnetization direction (out of) illustratively normal to the plane of the sheet.

Figure 1:
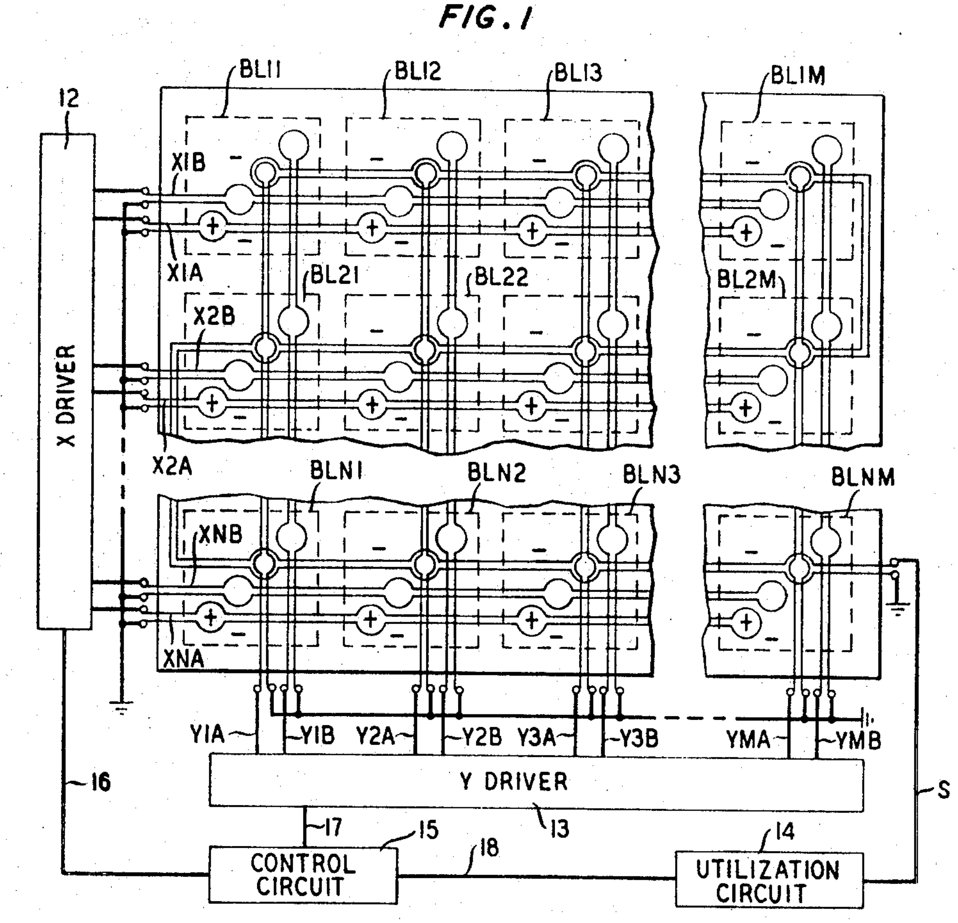
FIGS. 1 and 8 are schematic illustrations of memory arrangements in accordance with this invention.

A plurality of propagation conductors define a matrix of multiposition bit locations in sheet 11. Specifically, a plurality of X conductors arranged, illustratively, along rows, intersect a plurality of Y conductors arranged along columns as shown in FIG. 1. Each of the X and Y conductors includes a return path to ground and is of a geometry to form conducting loops with corresponding portions of corresponding return paths. The conductors are organized in pairs designated A and B, a pair of X conductors and a pair of Y conductors forming a bit location. Each location, as may be seen from FIG. 1, comprises a loop in each conductor of corresponding X and Y conductors, the loops being arranged, illustratively, along diagonals. Thus bit location BL11, defined by the X1 conductor pair and the Y1 conductor pair, includes four loops, one in each of the defining conductors. The X and Y conductors originate at X and Y drivers 12 and 13 respectively.

A sense conductor S, also including a return path to ground, forms a series of conducting loops with corresponding portions of that return path. The loops are positioned to coincide with a loop in each bit location defined by the corresponding YA conductor there. Sense conductor S is connected to a utilization circuit 14.

X and Y drivers 12 and 13 and utilization circuit 14 are connected to a control circuit 15 by means of conductors 16, 17, and 18, respectively. The various drivers and circuits may be any such circuits capable of operating in accordance with this invention.

The preparation of a suitable magnetic sheet for the memory arrangement of FIG. 1 is known in the art and discussed further hereinafter. The provision and the disposition of suitable single wall reverse domains in such a sheet is disclosed in the aforementioned copending application filed for P. C. Michaelis and in the aforementioned copending application filed for A. H. Bobeck et al. An understanding of the means for so disposing the domains initially is not essential for an understanding of this invention. It is merely assumed that each bit location in the arrangement of FIG. 1 includes a single wall domain provided by means disclosed elsewhere.

For the purpose of simplifying the description, we will assume that sheet 11 is magnetized in a direction into the plane of the sheet as viewed in FIG. 1. This magnetization direction is represented with minus signs. The single wall domain, then, is a domain magnetized out of the plane of the sheet as is represented by a plus sign. The domain wall of such a domain may be assumed to coincide with the corresponding conducting loop. In practice, however, the wall may occupy a space larger than the loop permitting propagation without overlapping conducting loops as is discussed in the aforementioned application of Bobeck et al.

As shown in FIG. 1 each bit location initially includes a single wall domain in a position corresponding to the conducting loop formed by the corresponding XA conductor and its return path. Each bit location in the memory arrangement of FIG. 1 includes four conducting loops defined by conductors XA, XB, YA, and YB. The conducting loop defined by conductor XA initially includes a single wall domain and is designated the first or "zero" position. The conducting loop defined by conductor YB is designated the second or "one" position. The efficacy of the arrangement of FIG. 1 is demonstrated by moving a single wall domain from the first to the second position in a selected bit location. The conducting loop defined by a conductor YA is associated with a loop defined by sense conductor S. It will become clear that a binary one represented by a single wall domain in a second position is detected selectively by the movement of that single wall domain first to the position of the corresponding loop in the sense conductor and then to the next adjacent position.

The operation of the memory arrangement of FIG. 1 is described specifically in connection with FIGS. 2, 3, 4, 5, 6, and 7. FIGS. 2 through 5 and 7 are abstractions representing the matrix of bit locations shown in FIG. 1. The initial disposition of single wall domains is shown in FIG. 1. Specifically, each single wall domain is in a first position as indicated by the plus (+) signs in FIG. 1. Say we wish to store a binary one in bit location BL11. This entails the movement of the single wall domain stored in the first position of bit location BL11 to the second position there.

Figure 2:
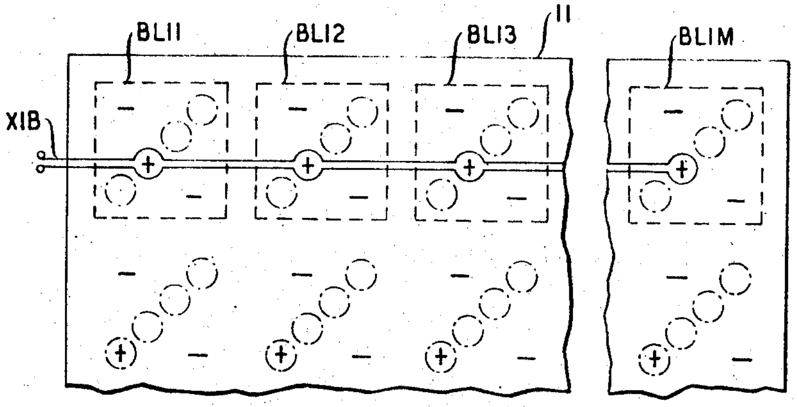
FIGS. 2, 3, 4, 5 and 7 are schematic illustrations of portions of the memory arrangement of FIG. 1 showing the magnetic condition thereof during operation.

To effect the storage of a binary one in bit location BL11, first conductor X1B is pulsed by the X driver 12 under the control of control circuit 15. The single wall domains in each of bit locations BL11, BL12, BL13 . . ., and BL1M move from the first positions in the corresponding locations to the positions defined by the corresponding loops in conductor X1B there. The disposition of the domains is shown in FIG. 2. The domains in the remaining bit location not associated with conductor X1B, of course, are completely undisturbed by the pulse on conductor X1B.

Figure 3:
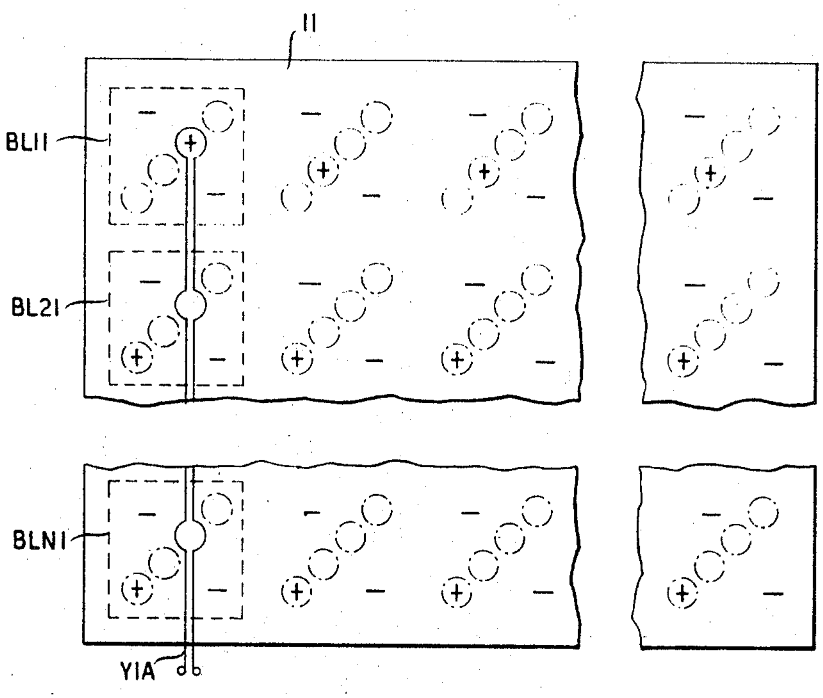

Next, conductor Y1A is similarly pulsed moving the single wall domains in bit locations BL11, BL21 . . ., and BLN1 to positions defined by corresponding loops in conductor Y1A from positions defined by next adjacent loops if those last-mentioned positions are occupied. The resulting disposition of the single wall domains is represented by FIG. 3. Again, the domains in the bit locations not associated with conductor Y1A are unaffected by the pulse in that conductor. Also bit locations associated with conductor Y1A but having next adjacent loop positions unoccupied are not affected.

Figure 4:
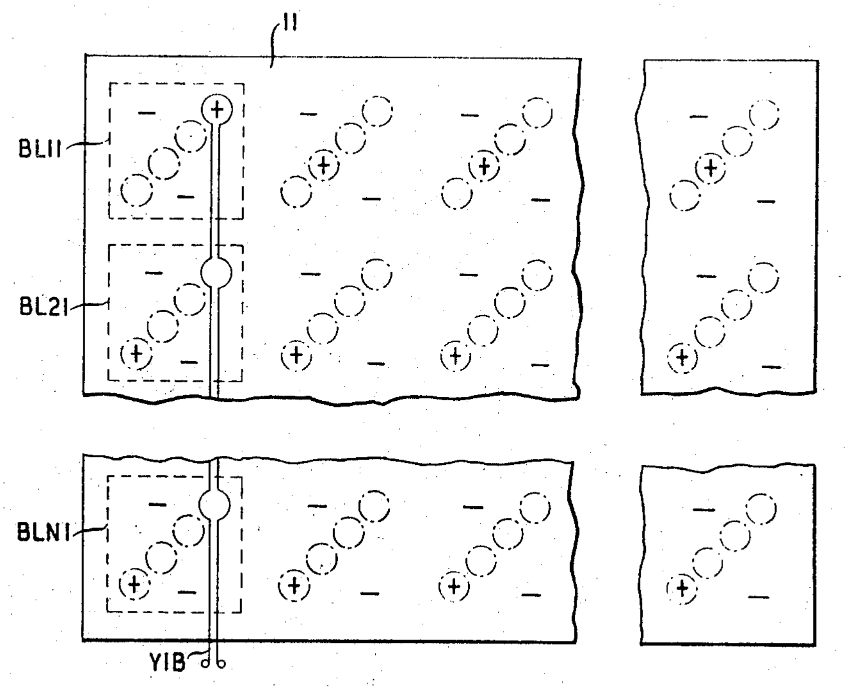

Thirdly, conductor Y1B is similarly pulsed. Consequently, the single wall domains in bit locations BL11, BL21 . . ., and BLN1 move to corresponding loops defined by conductor Y1B if they occupy next adjacent positions when that conductor is pulsed. FIG. 3 shows that only bit location BL11 has a domain properly disposed for movement in response to such a pulse. The resulting disposition of domains is shown in FIG. 4.

Figure 5:
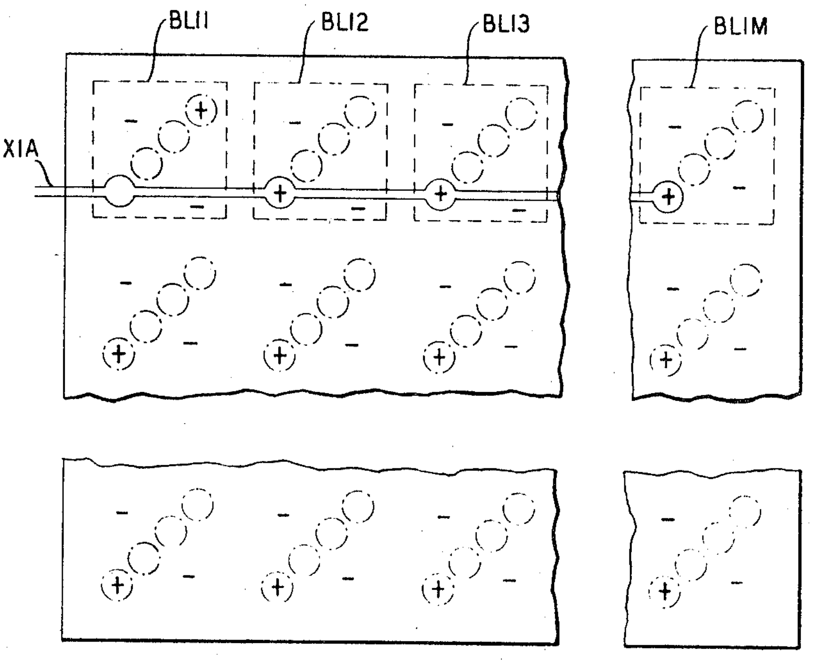

Finally, conductor X1A is similarly pulsed for returning single wall domains in positions in bit locations BL11, BL12, BL13 . . ., and BL1M to the initial (first) positions as shown in FIG. 1 if those bit locations include domains in next adjacent positions. Only locations BL12, BL13 . . ., and BL1M include domains in next adjacent positions. The final disposition of domains then is as shown in FIG. 5. A binary one has been written into representative bit location BL11.

The memory is organized on a random access basis. Accordingly, a binary one may be stored in any selected location by a like write operation. A binary zero is stored by inhibiting the pulse on conductor X1B or on Y1A, either of which is necessary for the above write (one) operation, under the control of control circuit 15.

Figure 6:
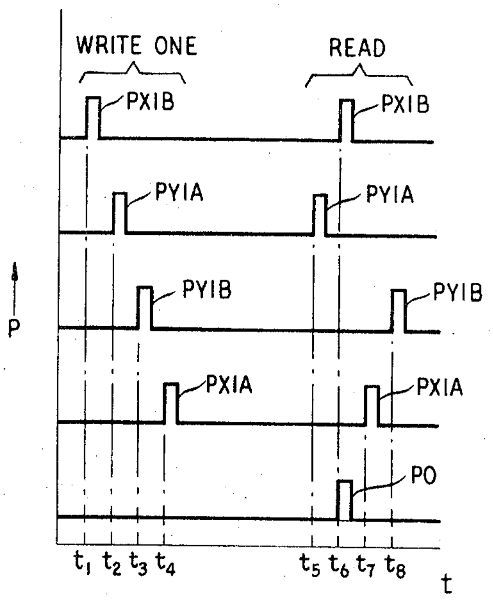
FIG. 6 is a pulse diagram of the operation of the memory arrangement of FIG. 1.

The write (one) pulse sequence is represented in the pulse diagram of FIG. 6 as pulses PX1B, PY1A, PY1B, and PX1A applied to conductors X1B, Y1A, Y1B, and X1A at arbitrary times *t*1, *t*2, *t*3, and *t*4, respectively. The read operation also is shown in FIG. 6 as the sequence of pulses PY1A, PX1B, PX1A, and PY1B similarly applied to conductors Y1A, X1B, X1A, and Y1B at time *t*5 by the Y driver circuit 13 under the control of essentially the reverse of the write one operation and returns the domain in the selected bit location to the zero position there. The read operation is, illustratively, destructive.

Figure 7:
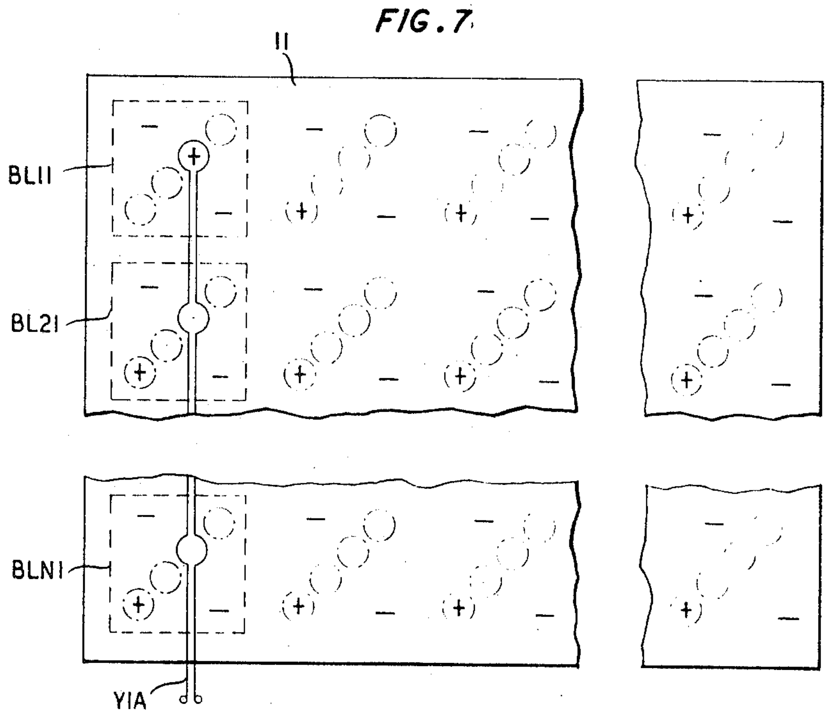

Consider the read operation with respect to the representative bit location BL11. Information is disposed as shown in FIG. 5. First then, conductor Y1A is pulsed at time *t*5 by the Y driver circuit 13 under the control of control circuit 15. Domains in positions next adjacent the loops defined by conductor Y1A in bit locations BL11, BL21 . . . , and BLN1 move to the positions defined by that conductor. Only bit location BL11 has a domain so positioned as shown in FIG. 5. The resulting disposition of domains is shown in FIG. 7.

Next, at time *t*6 in FIG. 6, conductor X1B is similarly pulsed moving to positions in bit locations BL11, BL12, BL13 . . . , and BL1M defined by loops therein, those domains in next adjacent positions when that conductor is pulsed. Each of those bit locations has a domain in a position to so move. The resulting domain disposition is shown in FIG. 2. When the domain in bit location BL11 moves from the position shown in FIG. 7 to that shown in FIG. 2 it induces a pulse PO in sense conductor S (see FIG. 1) which is detected by utilization circuit 14 under the control of control circuit 15. When the domains in bit locations BL12, BL13 . . . , and BL1M move from the position shown in FIG. 7 to those shown in FIG. 2, no such pulses are induced.

Driver 12 applies a pulse PX1A to conductor X1A at time *t*7 in FIG. 6 under the control of control circuit 15. That pulse moves single wall domains in bit locations BL11, BL12, BL13 . . . , and BL1M to first positions there as shown in FIG. 1.

Finally, a pulse PY1B is applied similarly, at a time *t*8 in FIG. 6, to return to second positions any stored ones which may have been stored during other operations in bit locations BL11, BL21 . . . , and BLN1 and were disturbed by the pulse on conductor Y1A earlier during the present read operation. The final disposition of domains is as shown in FIG. 1 assuming that no other binary ones had been so stored. Had other binary ones been stored, the positions of those domains is unchanged at the end of either a write or a read operation as is clear.

In an alternative read operation the pulse PX1B is applied to conductor X1B before the pulse PY1A is applied to conductor Y1A and continued until after the latter pulse is terminated.

Figure 8:
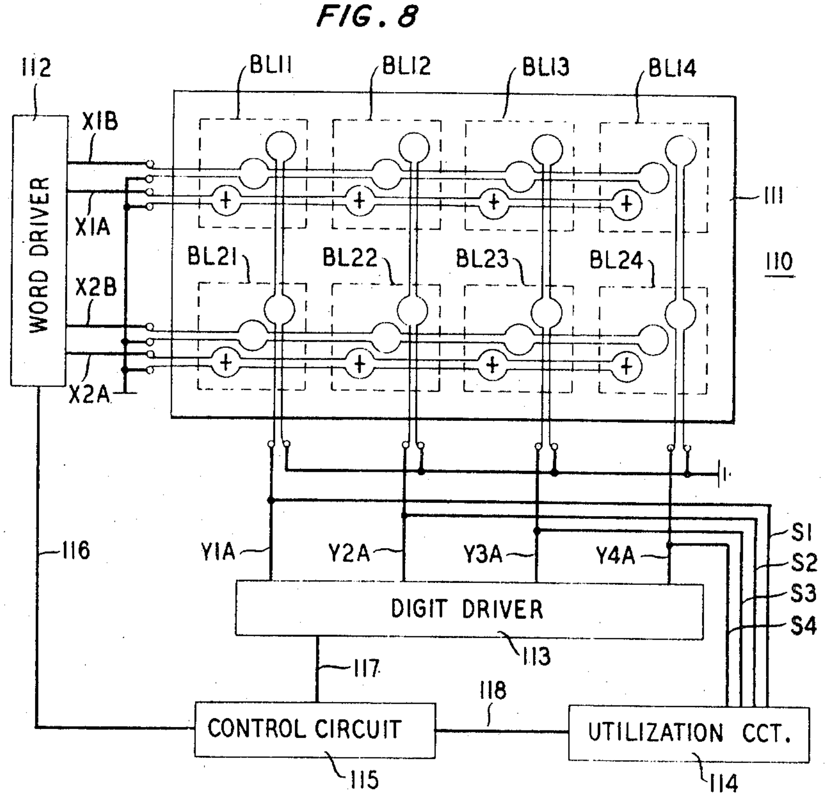

FIG. 8 shows a linear select memory arrangement 110 in accordance with another aspect of this invention. The memory arrangement comprises a sheet 111 of a magnetic material having the properties described hereinbefore. Row and column propagation conductors define three-loop (position) bit locations in sheet 111. Specifically, row conductors X1A, X1B, X2A, and X2B and column conductors Y1A, Y2A, Y3A, and Y4A define bit locations generally at intersections therebetween. The X conductors are designated as are the counterparts thereof in FIG. 1 and, as do the latter, include return paths to ground with which portions of the conductors form conducting loops. Only one Y conductor is used for a linear select organization rather than a pair of Y conductors as is used in the random access organization. The Y conductor is designated by an A to indicate the correspondence to its counterpart in the arrangement of FIG. 1. The X conductors originate at a word driver 112; the Y conductors originate at a digit driver 113. Sense conductors S1, S2, S3, and S4 are connected between Y (digit) conductors Y1A, Y2A, Y3A, and Y4A, respectively, and a utilization circuit 114.

The word and digit drivers 112 and 113 and the utilization circuit 114 are connected to a control circuit 115 by means of conductors 116, 117, and 118, respectively. The various drivers and circuits may be any such elements capable of operating in accordance with this invention.

Operation of the linear select memory arrangement of FIG. 8 is analogous to the operation of the random access memory of FIG. 1 except that sensing of stored information (ones) ocurs when information is moved from positions defined by loops in conductors YA in response to a pulse applied to a corresponding XB conductor. The presence (and absence) of single wall domains so moved is detected in parallel via corresponding YA conductors by means of utilization circuit 114 under the control of control circuit 115.

Accordingly, single wall domains are stored initially in (first) positions defined by loops in XA conductors as shown in FIG. 8 by the plus (+) signs there and selectively moved to (second) positions defined by loops in the corresponding YA conductors by a pulse on each of conductors XB, YA, and XA by means of drivers 112 and 113 under the control of control circuit 115. The pulse on XA returns any "disturbed" information to its initial position. The domain is "left" in the first (binary zero) position in any location where the pulse YA is inhibited. Thus an illustrative word 1011 is stored in bit locations BL11, BL12, BL13, and BL14, respectively, by applying pulses to conductors X1B and by applying pulses thereafter only to conductors Y1A, Y3A, and Y4A while no pulse is applied to conductor Y2A. A final pulse on conductor X1A returns to the position shown, the single wall domain stored in bit location BL21 disturbed by the pulse on conductor X1B.

The readout operation entails the provision of a pulse on conductor X1B by means of word driver 112 under the control of control circuit 115. Such a pulse moves domains in binary one positions to the position defined by loops in the conductor X1B thus coupling the corresponding YA conductors where ones are stored. Consequently, a pulse appears in conductors Y1A, Y3A, and Y4A whereas a null appears in conductor Y2A. For nondestructive read (actually a read-restore) operation, the corresponding YA conductors are pulsed via digit driver 113 under the control of control circuit 115 for returning the domains to the binary one (second) position. For destructive read, conductor X1A is similarly pulsed for moving all domains so sensed to a binary zero (first) position. It is clear that conductor X1A is pulsed in either instance to correct for disturbed binary zeros as described hereinbefore.

The invention has been described in terms of a sheet of a magnetic material substantially isotropic in the plane of the sheet and conveniently having a preferred magnetization direction normal to the plane. Yttrium orthoferrite is an example of such a material. Such sheets are prepared by well known crystal growing, slicing, and lapping techniques to a thickness of about five mils. Thinner sheets are prepared by sputtering techniques such as are disclosed in copending application Ser. No. 446,470, filed Mar. 29, 1965 for J. R. Ligenza and now Patent No. 3,287,243.

The high nucleation thresholds provided by sheets of materials such as yttrium orthoferrite so far exceeds the wall motion threshold that advantageously wide latitude in drive currents is permitted leading to large operating margins when operating in accordance with this invention. In addition, high packing densities and low drive requirements are achieved. For example, sheets having thicknesses of one mil permit single wall domains one mil in diameter leading to a packing density of about $10^5$ bits per square inch. Less than 80 milliampere is required for drive current and the drive currents may exceed that value by more than a factor of five. Sheets of about 10,000 angstrom units permit domain diameters of one micron and drive currents of less than ten milliampere.

Anisotropic films of the type described in the aforementioned P. C. Michaelis application require a different propagation arrangement when adapted in accordance with this invention. The implementation of a compatible propagation arrangement for such films is not shown. Such an implementation, however, is entirely analogous to that described herein for affecting the disclosed movement of single wall domains.

What has been described is considered only illustrative of the principles of this invention. Accordingly, various and numerous other arrangements may be devised by those skilled in the art without departing from the spirit and scope of this invention.

What is claimed is:

1. A combination including a sheet of magnetic material, means for defining in said sheet bit locations including first and second positions, single wall domains being permanently located in each bit location, propagation means for selectively moving single wall domains betwen first and second positions in each bit location, and sense means for selectively detecting the presence of single wall domains in said second positions.

2. A combination in accordance with claim 1 wherein said magnetic material is substantially isotropic in the plane of said sheet and has a preferred magnetization direction out of the plane of the sheet.

3. A combination in accordance with claim 1 wherein said magnetic material is anisotropic in the plane of said sheet.

4. A combination in accordance with claim 2 wherein said propagation means comprises a plurality of X and Y conductors each including a return path and defining with corresponding portions of said return paths conducting loops for defining bit locations in said sheet, and circuit means selectively applying pulses to said X and Y conductors.

5. A combination in accordance with claim 4 wherein said X and said Y conductors are organized in pairs for defining in said sheet bit locations including four of said conducting loops for providing a random access memory where said first and second positions are spaced apart by first and second intermediate positions.

6. A combination in accordance with claim 4 wherein said X conductors are organized in pairs for defining with corresponding ones of said Y conductors bit locations including three conducting loops for providing a linear select memory wherein said first and second positions are spaced apart by an intermediate position.

7. A combination in accordance with claim 5 wherein said sense means includes a conductor and associated return path defining conducting loops coupled to corresponding ones of said bit locations at second intermediate positions there for selectively detecting the presence of a single wall domain when that domain is moved from said second intermediate position to said first intermediate position in a selected location.

References Cited

Spain, R. J.: Controlled Domain Tip Propagation, Part I. Journal of Applied Physics, vol. 37, No. 7, June 1966, pp. 2572–83.

BERNARD KONICK, Primary Examiner

G. M. HOFFMAN, Assistant Examiner